Figure 1:
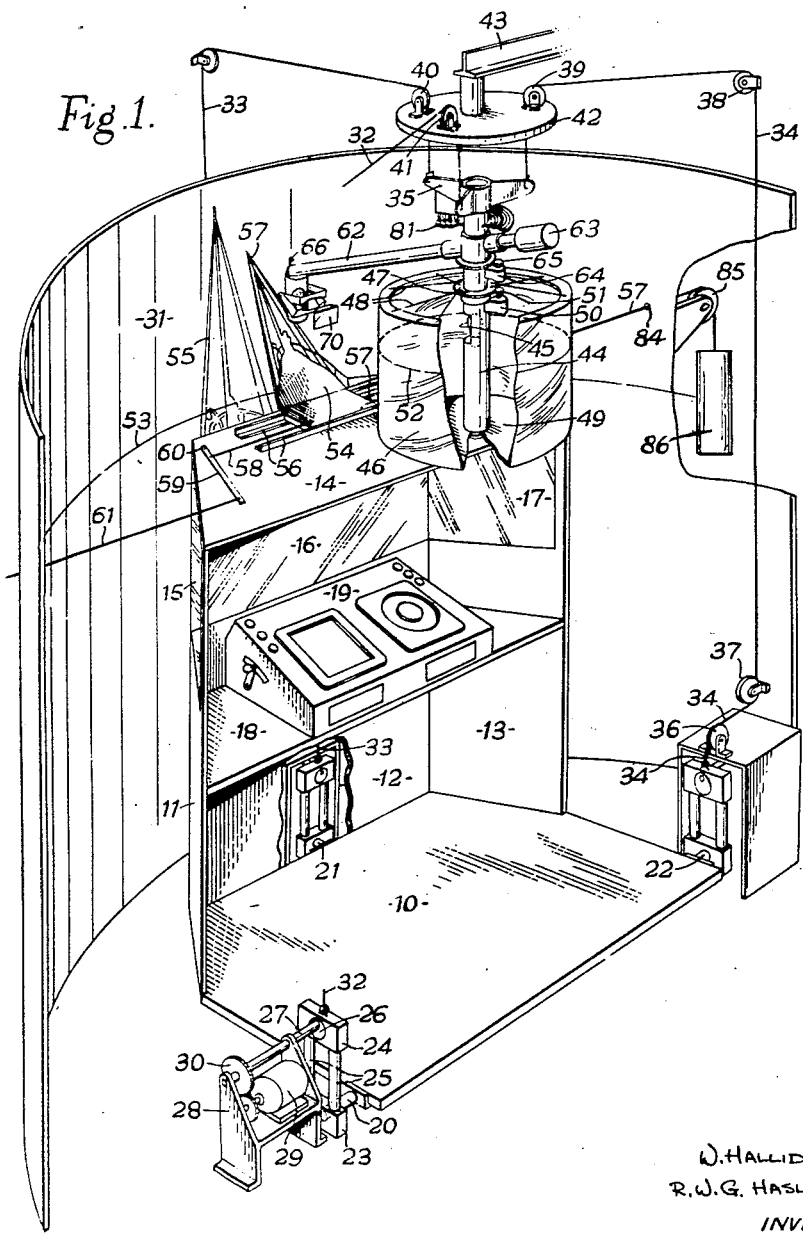

June 14, 1960 W. HALLIDAY ET AL 2,940,182
APPARATUS FOR TRAINING OPERATORS TO
WORK FROM UNSTABLE POSITIONS Filed Nov. 7, 1955 3 Sheets-Sheet 1

W. HALLIDAY &
R.W.G. HASLETT
INVENTORS

BY Moore & Hall
ATTORNEYS

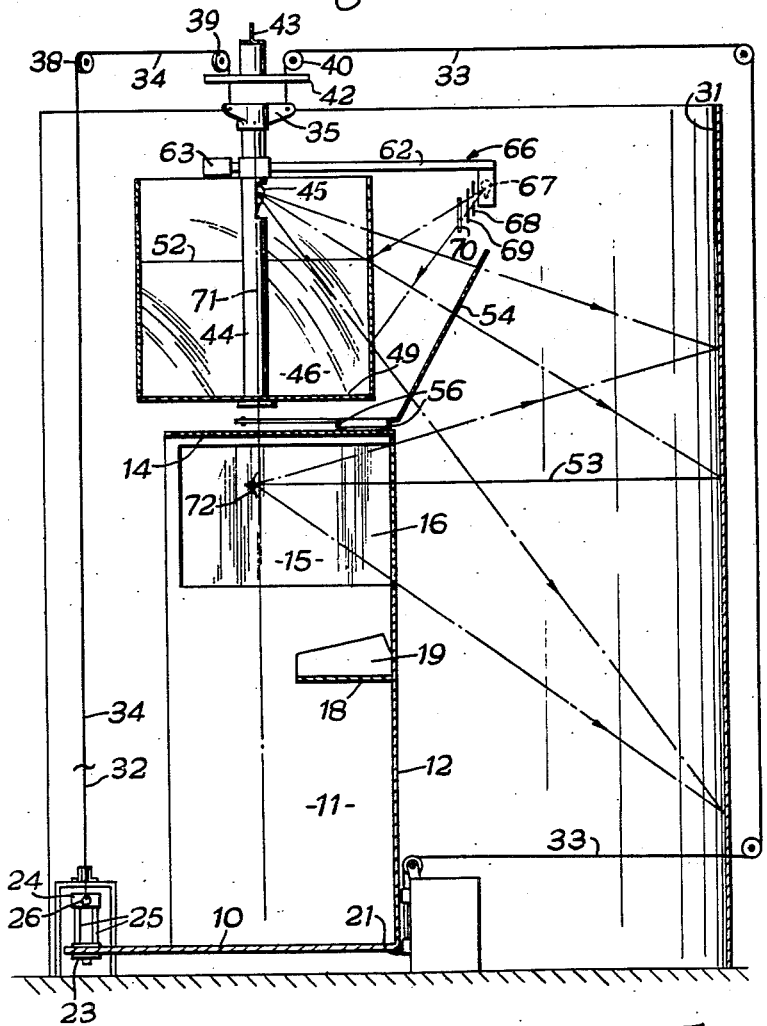
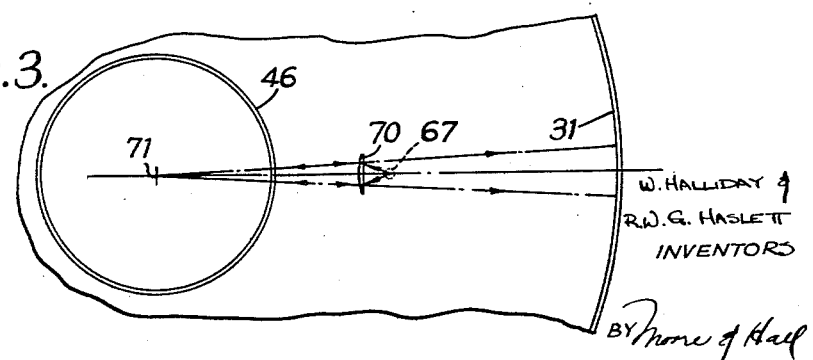

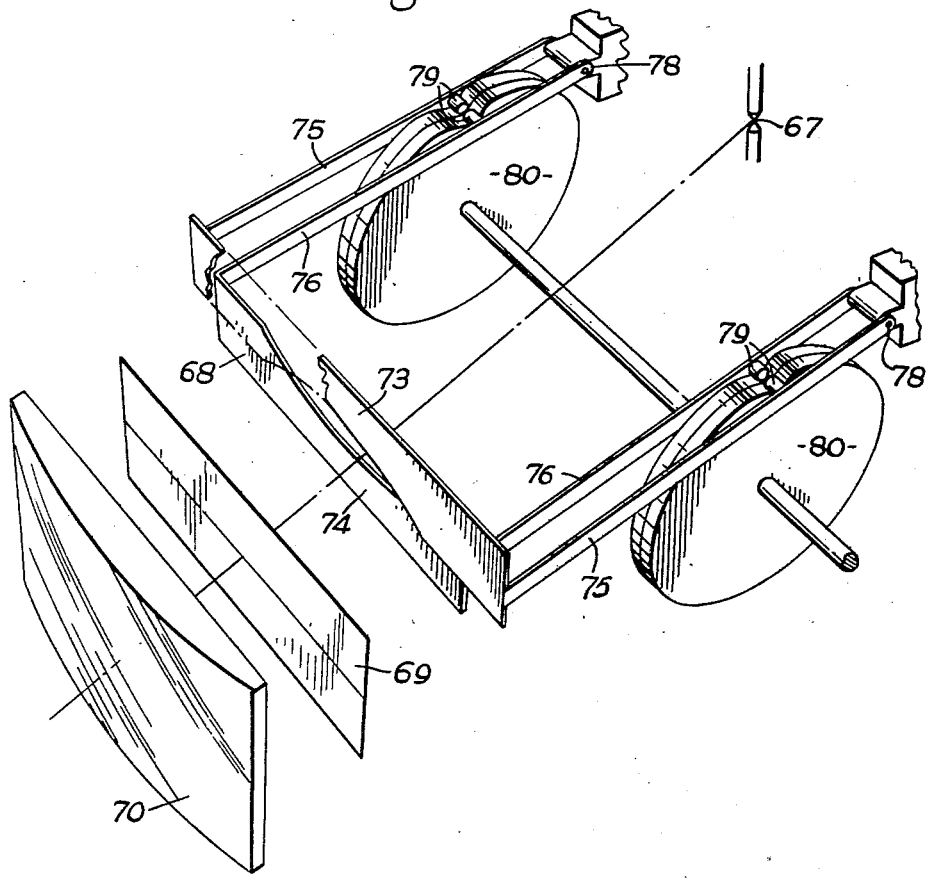

United States Patent Office 2,940,182
Patented June 14, 1960

2,940,182

APPARATUS FOR TRAINING OPERATORS TO WORK FROM UNSTABLE POSITIONS

William Halliday and Roy William George Haslett, both of Husun Works New North Road, Barkingside, England Filed Nov. 7, 1955, Ser. No. 545,478

Claims priority, application Great Britain Nov. 8, 1954

4 Claims. (Cl. 35—25)

The present invention relates to apparatus for training operators to work from unstable positions, that is from positions subject to rocking and other movements. An example is apparatus for training operators to work on board a whale-catcher using ultrasonic whale-finding gear. Other applications are, for example, in submarine asdic trainers, in trainers for anti-aircraft guns on ships at sea, and for gun-laying on ships at sea.

In all these forms of training apparatus, it is necessary to represent to the operator the motion of a target, or other object of interest, across a scene, and at the same time produce the impression of substantial movement of the operator's platform, seat or the like, relatively to the image of the scene.

The movements to be provided for may include rolling, pitching, rise and fall, and rotation of the observer's platform relative to the scene.

It has not been found easy in practice to provide an adequate degree of movement of the observer's platform and it is an object of the present invention to provide improved training apparatus in which the observer is given an impression of substantial movement in a simple and relatively inexpensive manner.

According to the present invention, apparatus for training operators to work from unstable platforms or the like comprises optical means for producing upon a screen an image of a scene to be viewed by the operator, means for causing the platform or the like to execute a limited movement and means for producing movement of the said image in such a manner as to increase substantially the movement of the image relatively to the operator, as viewed by the operator. What has been referred to as the "scene" may include fixed objects or reference lines, such as the horizon, and targets or other objects which are required to appear to the observer to move relatively to the fixed portion of the scene. Thus in the case of whale-catching, the whale appears but momentarily on the surface of the sea to breathe and the remainder of the time the whale is below the surface. On surfacing a large mass of air bubbles, sometimes known as a "blow-wake," is left stationary in the water and it is this blow-wake which must appear to move relatively to the ship in range, bearing and angle subtended at the observer's eye owing to movement of the ship. This apparent motion may be entirely due to the movement of the ship, as in the case of the blow-wake for example, or it may be due in part to movement of an object, such for example as a whale or submarine. The blow-wake is actually approximately circular in the water but appears elliptical when viewed from a distance. Range can be simulated by varying the declination of the projected image below the horizon and by varying the shape and size of the area of light representing the blow-wake. In the case of a whale-catcher trainer, the whale itself need not usually be represented in the visual presentation.

The presentation of an image of the blow-wake which is superimposed upon the remainder of the scene and which is capable of being displaced relatively thereto has presented considerable difficulty. In the first place, the image of the blow-wake must be correctly obscured by the bows, mast, rigging, etc. of the ship under all types of motion. Secondly, the mask or other object whose image is cast upon the screen to simulate the blow-wake has to be supported and it has been found difficult to prevent the support from casting a shadow upon the scene. It is a further object of the present invention to provide improved means for simulating a blow-wake or other object whose position it is desired to vary relatively to the scene.

According to a feature of the invention, therefore, an image of the scene to be viewed by the operator is produced on the screen by light from a first source directed along a light path through or past an appropriate representation of the scene, and an image of an object, such as the representation of a target, which is required to appear to the operator as superimposed upon the first-named image is produced upon the screen by light from a second source reflected by a body located in the said light path, the arrangement being such that when viewed from the screen the light from the second source comes substantially from the direction of the first source.

The said body may be a partly-reflecting, light-transmitting body of cylindrical or part-cylindrical shape arranged with its axis passing through the first source. The body reflects part of the incident light by having a shiny reflecting surface and, being translucent, transmits the non-reflected portion of the incident light. The said representation of the scene may be upon this body and the image of the scene may be produced by light from the first source passing through the body. The platform or other accommodation for the operator may be so arranged that the axis of curvature of the body passes substantially through the eyes of the operator.

The invention will be described by way of example with reference to the accompanying diagrammatic drawings, in which Figure 1 is a view in perspective of one embodiment of the invention as applied to a whale-catcher trainer.

Figure 2 is a diagrammatic view in side elevation of the optical system of Figure 1, Figure 3 is a diagrammatic view in plan of part of the optical system of Figures 1 and 2, and Figure 4 is a view in perspective of a part of the arrangement of Figure 1.

Referring to Figure 1, a cabin for the operator under training comprises a platform 10 on which he stands, three opaque walls 11, 12 and 13 fixed to the platform 10, an opaque roof 14 fixed to the walls and three windows 15, 16 and 17 through which the observer can look. Within the cabin is a shelf 18 serving as a support for apparatus 19 which the operator is required to manipulate in response to observations made from the cabin.

The cabin is given rocking movements through three pins 20, 21 and 22, fixed thereto and projecting therefrom, each associated with a like mechanism. Only the mechanism associated with the pin 20 is illustrated fully in the drawing. Thus the mechanism comprises a bearing block 23 in which the pin 20 engages in a ball bearing (not shown). The bearing block 23 is connected to a further block 24 by means of two rods 25. In the block 24 is an eccentric 26 mounted on a shaft 27 which is journalled in a frame 28 rigidly fixed to the floor of the room in which the apparatus is to be used. The shaft 27 is driven by an electric motor 29 through suitable gearing 30. Means, not shown, are provided for controlling independently the motor 29 and the motors associated with the pins 21 and 22, and in this way the speed of rotation of the shaft 27 with its eccentric 26 and corresponding shafts at the other position, and the relative phases of the eccentrics, can be varied. The amplitude of the motion which is given to the cabin is small. Thus for example in the apparatus illustrated, where the distance between pins 20 and 22 is 5 ft., the amplitude of motion at each of the pins is about ±2 ins. the angular movement of the platform 10 with respect to the floor of the building is therefore of the order of ±5°. The rods 25 are made sufficiently flexible to permit the required movements without binding of the eccentrics.

The impression of a relatively large rocking motion is given by means of a scene projected upon a screen 31 and arranged to move with considerably greater amplitude than the cabin and in the opposite sense, thus giving to the operator an impression of a large movement of his cabin.

The way in which the movement of the cabin is transmitted to the optical system is as follows. The mechanisms associated with pins 20, 21 and 22 are connected by means of wires 32, 33 and 34 respectively running over suitable pulleys with the arms of a spider 35. The pulleys in the case of the wire 34 are shown at 36, 37, 38 and 39. The other pulleys are arranged in like manner. The pulleys 39, and pulleys 40 and 41 associated with the wires 33 and 32 respectively, are mounted upon a plate 42 which is fixed to a girder 43 in the ceiling of the room in which the apparatus is installed. To the spider 35 is fixed a tube 44 which extends downwardly therefrom and accommodates a light source 45 which is a high pressure mercury vapour point light source. The tube 44 is cut away in the neighbourhood of the light source 45 to enable the light to illuminate the screen 31 over about 180°. Rotatably mounted on the tube 44 is a collar 47 supporting through spokes 48 a translucent drum 46 having a light-reflecting outer surface. An opaque plate 49 at the bottom of the drum 46 is mounted in a bearing in the lower end of the tube 44 which is not shown and gives additional support to the drum 46. The drum 46 is rotated by means of an electric motor 50 through gearing 51. Upon the drum is painted, in translucent paint, a scene including a horizon 52 with sky above it and sea below it. The light source 45 throws upon the screen 31 an image of the scene painted on the drum 46, the image of the horizon 52 being shown at 53.

It is necessary in this embodiment of the invention that the observer should see upon the screen 31 a representation of parts of the ship on which he is supposed to be travelling; such parts may include the bows, harpoon-gun, mast and catwalk. A shadow-casting member in the form of a silhouette 54 of these parts is therefore mounted upon the roof 14 of the cabin as a shadow-casting member and an image of this silhouette is cast by the light source 45 upon the screen 31 as indicated at 55. The silhouette is tilted forward, as shown, in order to clear the arm 62 to be described later.

When the pin 22 on the platform 10 falls, the roof of the cabin will be swung to the right in Figure 1, and if the silhouette 54 were fixed to the cabin roof 14, its image 55 would under these circumstances appear to move to the right. This would give an erroneous impression to the operator. The silhouette is therefore mounted upon rollers (not shown) running on tracks 56. To one end of the silhouette is fixed a string 57 which passes through an aperture 84 in the screen 31 over a pulley 85 and has attached to its end a weight 86, the weight tending to draw the silhouette to the right in Figure 1. To the other end of the silhouette is fixed a string 58 having its other end fixed to a suitable point in a lever 59. The lever 59 is pivoted at 60 to the roof 14 and its opposite end is connected by a further string 61 to the screen 31. By suitably selecting the points on the lever 59 at which the string 58 is attached, it can be arranged that movements of the cabin cause the silhouette to slide along the track 56 in such a manner as to produce the required impression of movement of the silhouette image 55.

For the purpose of casting upon the screen 31 an image representing the blow-wake there is provided an arm 62 rotatably mounted on the tube 44 and counterbalanced by a suitable weight 63. The arm 62 is rotatable by means of a motor 64 through gearing 65. The optical system 66 carried at the end of this arm 62 will be described with reference to Figures 2 and 3. As shown in Figure 2 the optical system 66 comprises a high pressure mercury vapour point light source 67, a shutter 68 which will be described in more detail later and which has an elliptical aperture of variable size, a further shutter 69 which may be electromagnetically operated in a manner not shown and which serves to open and close the light path from the source, and finally a cylindrical lens 70. Light from the source 67, after traversing the lens 70, falls upon the reflecting outer surface of the drum 46 whence it is reflected upon the screen 31.

In the illustrated example of the present invention in which parts of the ship represented by a silhouette 54 are imaged upon the screen 31, in order to give an illusion of the movements of the ship, it is necessary that the image of the silhouette 54 cast by the light source 67 should be exactly superimposed upon the image of the silhouette cast by the light source 45. For this purpose the light path from the source 45 through a point on the silhouette 54 to the screen 31 and the light path extending from the source 67 to the surface of the drum 46 and reflected from the surface of the drum through the same point on the silhouette to the screen are made coincident between the surface of the drum and the screen. In the illustrated example of the invention, this is achieved by making the perpendicular distance from the light source 67 to the axis 71 of the drum 46 equal to twice the radius of the drum 46 and it is arranged that the perpendicular from the light source 67 upon the axis 71 passes through the light source 45. The axis 71 is also arranged to pass substantially through the eye 72 of the observer. The drum 46 is also made truly cylindrical.

The lens 70 has no power in the vertical plane represented in Figure 2 and does not therefore affect the path of the light in that figure. However, as shown in Figure 3, in the horizontal plane the lens 70 is arranged to converge the light from the source 67 to such an extent that the light follows directions which lie in vertical planes that are radial with respect to the axis 71. The reflected light, therefore, also follows directions which lie in radial planes.

The aperture of the beam of light in Figure 3 is exaggerated for the sake of clearness of illustration. This aperture is determined by the shutter 68 which is shown more clearly in Figure 4. It comprises two shadow-casting members 73 and 74, the member 73 being mounted upon arms 75 and the member 74 upon arms 76, all these arms being pivoted at 78. The arms 75 and 76 are provided with inwardly-directed pins 79 which run on cam surfaces upon double cams 80. Each pin has a separate cam contour to control its movements. The cams are so arranged that by rotation thereof the aperture between the members 73 and 74 can be varied and at the same time the shutters 68 as a whole can be swung downwards or upwards. Thus in order to represent a distant blow-wake, the shutter is in a raised position and the aperture between the members 73 and 74 is small. In order to represent a blow-wake at short range, the shutter 68 is lowered and the aperture between the members 73 and 74 is increased. By means of the remotely operated shutter 69 the blow-wake can be made to appear and disappear as required.

The necessary electric supply for the optical system 66, including the supply for the lamp 67 and the shutters, is fed in through a slip-ring device 81. Electric supplies for the motors 50 and 64 and for the lamp 45 are fed through the upper end of the tube 44 since this tube remains stationary.

The motors 50 and 64 and the shutters of the optical system 66 in Figure 1 may be operated from a computer and information representing the action taken by the operator upon the control 19 may be sent back to the computer for comparison. The motors such as 29 controlling the rocking movements of the cabin and the rocking movements of the images on the screen 31 may be controlled arbitrarily and independently of the computer since they are intended to represent natural movements of the whale-catcher.

It will be evident that apparatus according to the present invention can be adapted to many purposes other than that particularly described with reference to the drawings.

We claim:

1. Apparatus for training an operator to work from an unstable position comprising, a fixed screen, optical means for producing upon said screen an image to be viewed by the operator, operator supporting means, means operatively connected to said operator support means for causing said operator supporting means to execute a limited movement relatively to said screen, and means governed by said last-named means for producing movement of said optical means relatively to said operator supporting means in a sense to increase substantially the movement of said image relatively to the operator, as viewed by the operator.

2. Apparatus for training an operator to work from an unstable position comprising a fixed screen of at least part-cylindrical shape, optical means for producing on the concave side of said screen an image to be viewed by the operator, operator supporting means, means causing the operator supporting means to execute a limited movement relatively to said screen and means connecting said optical means and said operator supporting means for producing movement of said optical means relatively to said operator supporting means in a sense to increase substantially the movement of said image relatively to the operator, as viewed by the operator, said optical means comprising a light-transmitting at least part-cylindrical body bearing a representation of a scene, said body having a light-reflecting outer surface, a first light source positioned to direct light along a first light path extending from the concave side of said body, through said body on to said screen to form an image of said representation on said screen, a second light source positioned to direct light along a second light path extending from the convex side of said body to said body, and, after reflection at the outer surface of said body, to said screen, the portions of said first and second light paths between said body and said screen having coincident optical axes, and a shadow-casting member located in said portions of the light paths.

3. Apparatus for training an operator to work from an unstable position comprising operator-supporting means, a screen of at least part-cylindrical shape positioned to be viewed by the operator, a light-transmitting and at least part-cylindrical body bearing a representation of a scene, said body having a light-reflecting outer surface, means for rotating said body about its axis of curvature, a first light source positioned to emit light from within said body and through said body toward said screen, thereby forming an image of said representation on said screen, a second light source mounted for rotation about said axis and positioned to emit light for reflection at the outer reflecting surface of said body on to said screen, an image-forming object disposed in the light path between said second light source and said screen whereby an image of said object is formed on said screen by light from said second light source after reflection in the outer surface of said screen, means operatively connected to said operator supporting means for causing the said operator-supporting means to execute a limited movement relatively to said screen, and means governed by said last-named means for producing movement of said axis relatively to said operator-supporting means in a sense to increase substantially the movement of said image relatively to the operator, as viewed by the operator.

4. Apparatus for training an operator comprising a screen, a first and a second light source, a light-reflecting and light-transmitting body, a representation of a scene in the form of a transparency upon said body, said first light source being disposed on the side of said representation remote from said screen, whereby light from said first source forms an image of said representation by transmitted light upon said screen, said second light source being positioned to have light therefrom reflected by said body upon said screen, an object located in the path of the light from said second source to said screen, said object having an aperture, and means for varying the size of said aperture.

References Cited in the file of this patent

UNITED STATES PATENTS

| | | |
|---|---|---|
| 2,046,202 | Miles | June 30, 1936 |
| 2,336,436 | Beindorf | Dec. 7, 1943 |
| 2,352,101 | Hutter | June 20, 1944 |
| 2,396,660 | Kanter | Mar. 19, 1946 |
| 2,409,938 | Hutter | Oct. 22, 1946 |
| 2,463,602 | Dehmel | Mar. 8, 1949 |
| 2,470,912 | Best et al. | May 24, 1949 |
| 2,662,305 | Alric | Dec. 15, 1953 |
| 2,694,869 | McNatt | Nov. 23, 1954 |